US008798046B2

(12) United States Patent
Shah et al.

(10) Patent No.: US 8,798,046 B2
(45) Date of Patent: Aug. 5, 2014

(54) METHODS AND APPARATUS FOR PROVIDING UNIQUE MAC ADDRESS TO INDIVIDUAL NODE FOR FIBRE CHANNEL OVER ETHERNET (FCOE) TRAFFIC

(75) Inventors: Ronak Shah, Sunnyvale, CA (US); Amit Shukla, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 744 days.

(21) Appl. No.: 12/976,222

(22) Filed: Dec. 22, 2010

(65) Prior Publication Data

US 2012/0163374 A1 Jun. 28, 2012

(51) Int. Cl.
*H04L 12/28* (2006.01)
*H04L 12/413* (2006.01)
*H04L 29/12* (2006.01)
*H04L 12/46* (2006.01)
*H04L 12/66* (2006.01)

(52) U.S. Cl.
CPC .......... *H04L 12/413* (2013.01); *H04L 61/6004* (2013.01); *H04L 61/6045* (2013.01); *H04L 61/2038* (2013.01); *H04L 12/4641* (2013.01); *H04L 61/6022* (2013.01); *H04L 12/66* (2013.01)
USPC ........................................................ 370/389

(58) Field of Classification Search
None
See application file for complete search history.

(56) References Cited

U.S. PATENT DOCUMENTS

| 8,165,136 | B1 * | 4/2012 | Sharma et al. | 370/401 |
| 8,270,420 | B2 * | 9/2012 | Wang et al. | 370/401 |
| 8,335,236 | B2 * | 12/2012 | Dhar et al. | 370/474 |
| 8,351,442 | B1 * | 1/2013 | McGlaughlin | 370/401 |
| 8,351,448 | B1 * | 1/2013 | McGlaughlin | 370/419 |
| 8,446,817 | B2 * | 5/2013 | Stine et al. | 370/217 |
| 2005/0125692 | A1 * | 6/2005 | Cox et al. | 713/201 |
| 2006/0072565 | A1 * | 4/2006 | Yazaki et al. | 370/389 |
| 2009/0037977 | A1 * | 2/2009 | Gai et al. | 726/1 |
| 2009/0052461 | A1 * | 2/2009 | Brown et al. | 370/401 |
| 2010/0232419 | A1 * | 9/2010 | Rivers | 370/352 |
| 2011/0022691 | A1 * | 1/2011 | Banerjee et al. | 709/221 |
| 2011/0064086 | A1 * | 3/2011 | Xiong et al. | 370/401 |

* cited by examiner

*Primary Examiner* — Ayaz Sheikh
*Assistant Examiner* — Faiyazkhan Ghafoerkhan
(74) *Attorney, Agent, or Firm* — Cooley LLP

(57) ABSTRACT

In one embodiment, an apparatus can include a filter module operatively coupled to a switching module. The filter module can be configured to define a filter to be applied to a Fiber Channel over Ethernet (FCoE) frame received from any port from multiple ports instantiated at a network device. The filter can be defined based at least in part on a first logical address associated with a first port from the multiple ports. The first logical address can be based at least in part on (1) a first identifier associated with a switch fabric to which the apparatus is operatively coupled and (2) a second identifier associated with a first port from the multiple ports. The filter module can be configured to define the filter such that a switching module sends the FCoE frame to a Fiber Channel device when a second logical address included in the FCoE frame matches the first logical address and the filter module is operatively coupled to the switching module.

18 Claims, 7 Drawing Sheets

METHODS AND APPARATUS FOR PROVIDING UNIQUE MAC ADDRESS TO INDIVIDUAL NODE FOR FIBRE CHANNEL OVER ETHERNET (FCOE) TRAFFIC

BACKGROUND

Some embodiments described herein relate generally to network switching, and more particularly to switching policies and filters for improved Fibre Channel over Ethernet (FCoE) network switching.

Many modern networks include hardware devices and/or software (executing in hardware) configured to transfer data frames according to one or both of the Ethernet and Fibre Channel networking standards. To allow for interoperability between Ethernet and Fibre Channel resources, these networks often employ a third network protocol known as Fibre Channel over Ethernet ("FCoE"). By encapsulating Fibre Channel frames within an FCoE frame, a network device such as an FCoE gateway can route Fibre Channel frames from one Fibre Channel device to another over an Ethernet network.

FCoE-to-Fibre Channel gateways ("FCoE gateways") thus are typically capable of: (1) relaying, to a Fibre Channel device (such as a switch), a Fibre Channel frame extracted from an FCoE frame, and (2) encapsulating a received Fibre Channel frame within an FCoE frame that can be forwarded, via an Ethernet network, to another Fibre Channel device (such as a Fibre Channel peripheral processing device). As part of its switching responsibilities, an FCoE gateway may adhere to one or more switching policies, rules or filters that dictate specific switching behavior. Many such filters dictate, for example, whether an FCoE gateway should deliver, drop, or re-direct a received frame based on the frame's type, format, and/or contents.

While such filters allow for more intelligent switching, storage space for these filters is sometimes limited due to scale and cost constraints. More particularly, when an FCoE gateway assigns a distinct Media Access Control ("MAC") address to each virtual Fibre Channel port instantiated at a peripheral Fibre Channel device, the presence of a filter rule for each MAC address/virtual port pair can result in inefficient use of filter storage space. Thus, a need exists for methods and apparatus to minimize the amount of storage space (i.e., memory) used to store such filters associated with the switching of FCoE frames to Fibre Channel devices.

Additionally, because devices executing on the periphery of a switch fabric system are often untrusted, a need further can exist for methods and apparatus to define one or more filters and/or switching policies to: 1) ensure that all data frames and/or packets received from a peripheral processing device include appropriate header and/or address information, and/or 2) prevent transmission of data frames including "spoofed" sender identity information.

SUMMARY

In one embodiment, an apparatus can include a filter module operatively coupled to a switching module. The filter module can be configured to define a filter to be applied to a Fibre Channel over Ethernet (FCoE) frame received from any port from multiple ports instantiated at a network device. The filter can be defined based at least in part on a first logical address associated with a first port from the multiple ports. The first logical address can be based at least in part on (1) a first identifier associated with a switch fabric to which the apparatus is operatively coupled, and (2) a second identifier associated with a first port from the multiple ports. The filter module can be configured to define the filter such that a switching module sends the FCoE frame to a Fibre Channel device when a second logical address included in the FCoE frame matches the first logical address and the filter module is operatively coupled to the switching module.

DETAILED DESCRIPTION

Figure 1:
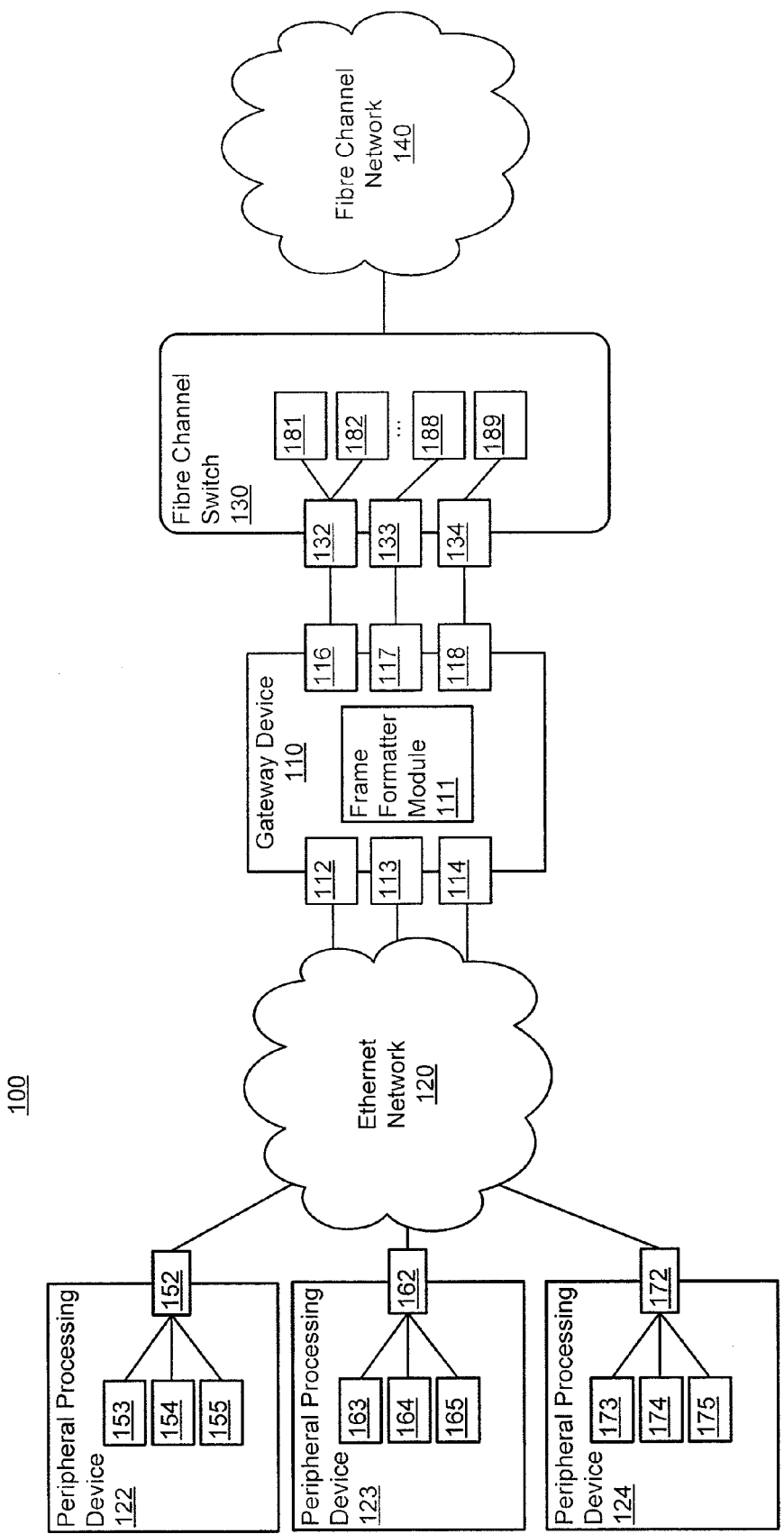
FIG. 1 is a schematic illustration of a mixed Ethernet and Fibre Channel portion of a network, according to an embodiment.

In some embodiments, an FCoE-to-Fibre Channel gateway ("FCoE gateway") can be coupled to one or more Fibre Channel peripheral processing devices via an Ethernet network and one or more Ethernet ports. The FCoE gateway can also be coupled to a Fibre Channel switch via one or more Fibre Channel ports. The Fibre Channel switch can include one or more virtual Fibre Channel F ports, and can be further operatively and/or physically coupled to a Fibre Channel network. Each of the peripheral processing devices can be physically and/or operatively coupled to the FCoE gateway via one or more FCoE ports and the Ethernet network. Any or all of the peripheral processing devices can include one or more virtual Fibre Channel N ports, each virtual Fibre Channel N port being uniquely and operatively coupled to a distinct virtual Fibre Channel F port instantiated at the Fibre Channel switch.

The FCoE gateway can receive a Fibre Channel over Ethernet Initialization Protocol (FIP) request from one of the Fibre Channel peripheral processing devices, the FIP request being based on a Fibre Channel fabric login request defined by one of the virtual Fibre Channel N ports instantiated at the Fibre Channel peripheral processing device. The FCoE gateway can then decapsulate the Fibre Channel fabric login from within the FIP request and send the Fibre Channel fabric login to the Fibre Channel switch for handling. In some embodiments, the Fibre Channel switch can next assign a MAC address to the requesting virtual Fibre Channel N port. The assigned MAC address can include a first 24-bit portion based on a Fibre Channel mapping (or "FC-MAP"). The FC-MAP can be based on, for example, an organizationally unique identifier (OUI) associated with a switch fabric of which the Fibre Channel switch is a part. The assigned MAC address can further include a second 24-bit portion based on a Fibre Channel Identifier (FCID) associated with a first virtual Fibre Channel N port from the peripheral processing device at which the requesting virtual Fibre Channel N port is instantiated. The Fibre Channel switch can next assign an FCID to the requesting virtual Fibre Channel N port. The assigned FCID can include an 8-bit domain ID associated with the Fibre Channel switch, an 8-bit area ID associated with a set of Fibre Channel ports of the Fibre Channel switch and an 8-bit port ID of a particular Fibre Channel port of the Fibre Channel switch. Having defined the assigned MAC address and FCID for the requesting virtual Fibre Channel N Port, the Fibre Channel switch can send a signal including a Fibre Channel fabric login response to the FCoE gateway via one of the Fibre Channel ports of the Fibre Channel switch. The Fibre Channel fabric login response can include the assigned MAC address and FCID for the requesting virtual Fibre Channel N port.

Upon receipt of the signal including the Fibre Channel fabric login response, the FCoE gateway can define a filter. The filter can be defined based at least in part on the assigned MAC address. In some embodiments, the filter can specify and/or allow that the FCoE gateway drop any received FCoE and/or Ethernet frame that does not include a source MAC address matching the MAC address assigned to the requesting virtual Fibre Channel N port (or another MAC address assigned to another virtual Fibre Channel N port on the network). In this manner, the FCoE gateway can prevent MAC address spoofing by only forwarding FCoE frames that have been sent by a valid virtual Fibre Channel N port having a valid assigned MAC address.

A switching module included on or at the FCoE gateway can apply the filter to one or more received FCoE frames. More specifically, upon receipt of an FCoE frame, the FCoE gateway can determine whether a source MAC address included in the FCoE frame matches any MAC address assigned by the Fibre Channel switch and/or the FCoE gateway. If the switching module determines that the source MAC address included in the FCoE frame matches, for example, the assigned MAC address described above, the switching module can extract an encapsulated Fibre Channel frame included in the FCoE frame and forward the Fibre Channel frame to the Fibre Channel switch. Alternatively, if the switching module determines that the source MAC address included in the FCoE frame does not match any MAC address assigned by the Fibre Channel switch, the switching module can "drop" the FCoE frame, i.e., not forward it on to the Fibre Channel switch or any other device included in the network.

FIG. 1 is a schematic illustration of a mixed Ethernet and Fibre Channel portion of a network, according to an embodiment. More specifically, FIG. 1 illustrates a Network Portion 100 that includes a Gateway Device 110 physically and/or operatively coupled to Peripheral Processing Devices 122-124 (via an Ethernet Network 120 and Ethernet Ports 112-114) and a Fibre Channel Switch 130 (via Fibre Channel Ports 116-118). The Fibre Channel Switch 130 is operatively and/or physically coupled to the Gateway Device 110 via the Fibre Channel Ports 132-134, and to a Fibre Channel Network 140. The Fibre Channel Switch 130 includes a set of Virtual Fibre Channel F Ports 181-189, and each of the Virtual Fibre Channel F Ports 181-189 is operatively coupled to at least one of the Fibre Channel Ports 132-134. The Peripheral Processing Devices 122-124 are operatively and/or physically coupled to the Gateway Device 110 via the FCoE Ports 152, 162 and 172, respectively, and the Ethernet Network 120. The FCoE Ports 152, 162 and 172 are operatively coupled to the Virtual Fibre Channel N Ports 153-155, 163-165 and 173-175, respectively. Each of the Virtual Fibre Channel N Ports 153-155, 163-165 and 173-175 is uniquely and operatively coupled to one of the Virtual Fibre Channel F Ports 181-189 instantiated at the Fibre Channel Switch 130.

The Network Portion 100 can include a combination of hardware and/or software (executing on hardware) configured to transmit data between any of the Peripheral Processing Devices 122-124 and the Fibre Channel Network 140 via the Ethernet Network 120, the Gateway Device 110 and the Fibre Channel Switch 130. The Network Portion 100 can be, for example, a portion of a data center fabric, local area network (LAN), wide area network (WAN), storage area network (SAN), intranet, or the Internet.

The Gateway Device 110 can be, for example, an FCoE gateway. In some embodiments, the Gateway Device 110 can be configured to transmit data based at least in part on the Ethernet, Fibre Channel and/or FCoE network protocols via the Ethernet Ports 112-114 and/or the Fibre Channel Ports 116-118. In such embodiments, the Ethernet Ports 112-114 can be configured to send FCoE frames to and/or receive FCoE frames from any of the FCoE Ports 152, 162 and 172 via the Ethernet Network 120. In such embodiments, the Fibre Channel Ports 116-118 can be Fibre Channel ports configured to send Fibre Channel frames to and/or receive Fibre Channel frames from the Fibre Channel Switch 130. As shown in FIG. 1, the Gateway Device 110 also includes a Frame Formatter Module 111 configured to format received FCoE, Ethernet and/or Fibre Channel frames for transmission to a network device or switch.

In some embodiments, each of the Ethernet Ports 112-114 can be a physical Ethernet port configured to exchange data with any of the Peripheral Processing Devices 122-124 via the Ethernet Network 120 and the FCoE Ports 152, 162 and 172, respectively. Although not shown in FIG. 1, in some embodiments, each of the Ethernet Ports 112-114 can be physically coupled to one of multiple Ethernet Network Interface Cards (NICs) included in the Gateway Device 110.

As shown in FIG. 1, each of the Fibre Channel Ports 116-118 is uniquely coupled to one of the Fibre Channel Ports 132-134 of the Fibre Channel Switch 130. In some embodiments, each of the Fibre Channel Ports 116-118 can be a physical Fibre Channel F port configured to allow exchange of one or more Fibre Channel frames between the Gateway Device 110 and the Fibre Channel Switch 130.

In some embodiments, the Frame Formatter Module 111 can be any hardware-based module and/or software-based module (executing in hardware) configured to (1) encapsulate received Fibre Channel frames within FCoE frames for transmission via the Ethernet Network 120, and/or (2) extract (decapsulate) Fibre Channel frames from received FCoE frames for transmission to the Fibre Channel Switch 130.

Although not shown in FIG. 1, the Gateway Device 110 can include one or more data structures indicating one or more switching policies, rules and/or filters. For example, in some embodiments, the Gateway Device 110 can include and/or be operatively coupled to a switching table and/or filter database (not shown in FIG. 1) used by the Gateway Device 110 when switching data frames to one or more of the Peripheral Processing Devices 122-124 and/or the Fibre Channel Switch 130. Accordingly, the Gateway Device 110 can serve as a gateway between the Peripheral Processing Devices 122-124 and the Fibre Channel Switch 130, allowing for the transmission of FCoE frames from the Peripheral Processing Devices 122-124 to the Fibre Channel Switch 130, and for the transmission of Fibre Channel frames from the Fibre Channel Switch 130 to any of the Peripheral Processing Devices 122-124.

In some embodiments, the Gateway Device 110 can be physically located within the same physical chassis as the Fibre Channel Switch 130. In some embodiments, the Gateway Device 110 can function as both an FCoE gateway and a Fibre Channel switching device. Alternatively, the Gateway Device 110 and the Fibre Channel Switch can be located within different chasses.

The Ethernet Network 120 can be any combination of network hardware devices and/or software modules (executing in hardware) that together comprise an Ethernet network. The Ethernet Network 120 can include, for example, one or more Ethernet-compatible switches, routers, peripheral devices, servers, line cards and/or network interface cards (NICs). In some embodiments, the Ethernet Network 120 can include one or more devices and/or modules physically and/or operatively coupled via cable (such as Category 5 cable) and/or one or more wireless connections.

As shown in FIG. 1, the Ethernet Network 120 is operatively and/or physically coupled to each of the Peripheral Processing Devices 122-124 via the FCoE Ports 152, 162 and 172, respectively. Although not shown in FIG. 1, in some embodiments, any or all of the Peripheral Processing Devices 122-124 can be included in the Ethernet Network 120. In some embodiments, the Ethernet Network 120 can transmit one or more FCoE frames to one or more of the Peripheral Processing Devices 122-124. The one or more FCoE frames (not shown in FIG. 1) can include encapsulated Fibre Channel frames originally sent from the Fibre Channel Network 140 and/or the Fibre Channel Switch 130. Additionally, the Ethernet Network 120 can optionally receive one or more FCoE and/or Ethernet frames from any of the Peripheral Processing Devices 122-124 for transmission to the Fibre Channel Switch 130 and/or the Fibre Channel Network 140 via the Gateway Device 110.

Each of the Peripheral Processing Devices 122-124 can be any combination of hardware and/or software (executing in hardware) capable of transmitting information to and/or receiving information from the Gateway Device 110 via the Ethernet Network 120. In some embodiments, one or more of the above-described peripheral processing devices can be a server device, an application server, a database system, a storage device, gateway, workstation, a compute device and/or the like. Each of the Peripheral Processing Devices 122-124 can optionally be, for example, compute nodes, service nodes, routers, and/or storage nodes. In some embodiments, one or more of the Peripheral Processing Devices 122-124 can perform one or more computing tasks, such as one or more data storage, software-as-a-service (SAS), web service, content request, or other computing tasks. In some embodiments, one or more of the Peripheral Processing Devices 122-124 can be a Fibre Channel-based device operatively and/or physically coupled to one or more other Fibre Channel-based devices, such as a Fibre Channel switch, a Fibre Channel fabric, a SAN, etc.

As shown in FIG. 1, the Peripheral Processing Devices 122-124 can include the FCoE Ports 152, 162 and 172, respectively, and the Virtual Fibre Channel N Ports 153-155, 163-165 and 173-175, respectively. In some embodiments, each of the Virtual Fibre Channel N Ports 153-155, 163-165 and 173-175 can be configured to send one or more Fibre Channel frames for encapsulation within an FCoE frame and subsequent transmission by the corresponding FCoE port from the FCoE Ports 152, 162 and 172. The appropriate FCoE port from the FCoE Ports 152, 162 and 172 can transmit the FCoE frame to the Gateway Device 110 via the Ethernet Network 120. Each of the Virtual Fibre Channel N Ports 153-155, 163-165 and 173-175 can also be configured to receive one or more Fibre Channel frames that have been extracted and/or decapsulated from one or more FCoE frames, each of the FCoE frames having been received by the corresponding FCoE port from the FCoE Ports 152, 162 and 172 via the Ethernet Network 120.

In some embodiments, the Peripheral Processing Devices 122-124 can be in communication with the Ethernet Network 120 via any suitable connection such as, for example, an optical connection (e.g., an optical cable and optical connectors), an electrical connection (e.g., an electrical cable and electrical connectors) and/or the like. Similarly stated, each of the FCoE Ports 152, 162 and 172 can provide a communication interface through which a Peripheral Processing Device 122-124 can be operatively coupled to the Ethernet Network 120.

As such, the Peripheral Processing Devices 122-124 are configured to send data (e.g., Ethernet frames, FCoE frames, data frames, data cells, etc.) to and receive data from the Ethernet Network 120. In some embodiments, each connection between the Peripheral Processing Devices 122-124 and the Ethernet Network 120 is a direct link. In other embodiments, the Peripheral Processing Devices 122-124 can be operatively coupled to the Ethernet Network 120 via intermediate modules or devices. In some embodiments, any combination of the Peripheral Processing Devices 122-124 can be physically located within the same physical chassis as one another and/or any other device included in the Ethernet Network 120. In other embodiments, each of the Peripheral Processing Devices 122-124 can be located within a different chassis.

The FCoE ports 152, 162 and 172 can be physical Ethernet ports capable of sending and/or receiving one or more Ethernet and/or FCoE frames. In some embodiments, each of the FCoE ports 152, 162 and 172 can be associated with and/or located on a physical line card (not shown in FIG. 1), such as an Ethernet NIC. In some embodiments, each of the FCoE ports 152, 162 and 172 can include and/or be associated with a frame formatter module (not shown in FIG. 1) included at each of the Peripheral Processing Device 122-124, respectively. Each such frame formatter module can be configured to encapsulate Fibre Channel frames received from a virtual Fibre Channel N port within FCoE frames for transmission via the Ethernet Network 120. In such embodiments, each such frame formatter module can be further configured to decapsulate and/or extract Fibre Channel frames from within FCoE frames received via the Ethernet Network 120.

The Virtual Fibre Channel N Ports 153-155, 163-165 and 173-175 can be virtual Fibre Channel N ports similar to those generally associated with Fibre Channel and/or FCoE networks. In some embodiments, one or more of the Virtual Fibre Channel N Ports 153-155, 163-165 and 173-175 can constitute one of two virtual end nodes that define a virtual link. In such embodiments, each such Virtual Fibre Channel N Port can each be operatively coupled to a Virtual Fibre Channel F Port from the Virtual Fibre Channel F Ports 181-189 instantiated at the Fibre Channel Switch 130.

The Fibre Channel Switch 130 can be any combination of hardware and/or software (executing in hardware) configured to perform switching of Fibre Channel frames received from the Gateway Device 110 and/or the Fibre Channel Network 140. As shown in FIG. 1, the Fibre Channel Switch 130 is situated between the Gateway Device 110 and the Fibre Channel Network 140, and can be configured to perform known switching tasks on Fibre Channel frames transmitted between the Gateway Device 110 and the Fibre Channel Network 140. As also shown in FIG. 1, the Fibre Channel Switch 130 includes Fibre Channel Ports 132-134, each of which is operatively and/or physically coupled to one of the Fibre Channel Ports 116-118 on the Gateway Device 110. In some embodiments, each of the Fibre Channel Ports 132-134 can be a Fibre Channel port configured to exchange one or more Fibre Channel frames with a single Fibre Channel port from the Fibre Channel Ports 116-118. The Fibre Channel Switch 130 also includes the Virtual Fibre Channel F Ports 181-189. In some embodiments, each of the Virtual Fibre Channel F Ports 181-189 can be operatively coupled to one of the Virtual Fibre Channel N Ports 153-155, 163-165 and 173-175 instantiated at the Peripheral Processing Devices 122, 123 and 124, respectively. In such embodiments, each of the Virtual Fibre Channel F Ports 181-189 can exchange Fibre Channel frames with a single virtual Fibre Channel N port from the Virtual Fibre Channel N Ports 153-155, 163-165 and 173-175, thus defining a virtual link between those two virtual Fibre Channel ports.

The Virtual Fibre Channel F Ports 181-189 can be virtual Fibre Channel F ports similar to those generally associated with Fibre Channel and/or FCoE networks. In some embodiments, one or more of the Virtual Fibre Channel F Ports 181-189 can constitute one of two virtual end nodes that define a virtual link. For example, as described above, each such Virtual Fibre Channel F Port can be operatively uniquely associated with a Virtual Fibre Channel N Port from the Virtual Fibre Channel F Ports 153-155, 163-165 and 173-175, thus defining a virtual link.

In some embodiments, the Fibre Channel Switch 130 can comprise multiple physical devices. In some embodiments, the Fibre Channel Switch 130 can be or include a Fibre Channel Switch Fabric, such as a multi-stage Fibre Channel fabric. In such embodiments, the Fibre Channel Switch 130 can be included in, for example, a data center, and can be define one or more logical hierarchical elements, such as virtual data center fabrics (VDCFs) and/or virtual local area networks (VLANs).

The Fibre Channel Network 140 can be any combination of hardware devices and/or software modules (executing in hardware) that together comprise a Fibre Channel network. For example, although not shown in FIG. 1, the Fibre Channel Network 140 can include one or more Fibre Channel-compatible servers and/or peripheral devices connected to one or more Fibre Channel switching devices including one or more Host Bus Adapters (HBAs). In some embodiments, the Fibre Channel Network 140 can include one or more subnetwork portions, such as one or more Fibre Channel zones and/or storage area networks (SANs). As shown in FIG. 1, the Fibre Channel Network 140 can be operatively coupled to the Peripheral Processing Devices 122-124 via the Ethernet Network 120, the Gateway Device 110 and the Fibre Channel Switch 130. In such embodiments, the Fibre Channel Network 140 can thus exchange data with the Peripheral Processing Devices 122-124.

Figure 2:
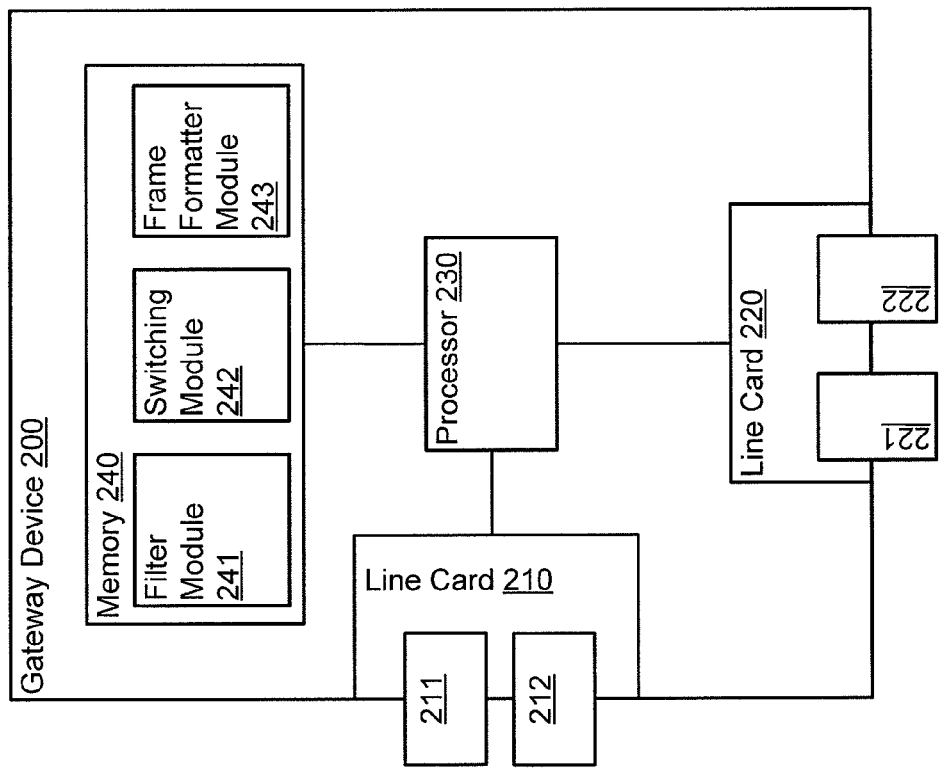
FIG. 2 is a schematic illustration of a gateway device of a mixed Fibre Channel/Ethernet network portion, according to another embodiment.

FIG. 2 is a schematic illustration of a gateway device of a mixed Fibre Channel/Ethernet network portion, according to another embodiment. More specifically, FIG. 2 is a system block diagram of a Gateway Device 200, similar to the Gateway Device 110 described in connection with FIG. 1 above. The Gateway Device 200 includes a Processor 230, a Memory 240, a Line Card 210 and a Line Card 220. The Memory 240 includes a Filter Module 241, a Switching Module 242 and a Frame Formatter Module 243. The Line Card 210 includes the Physical Ports 211 and 212, and the Line Card 220 includes the Physical Ports 221 and 222. The Processor 230 is operatively coupled to the Memory 240, the Line Card 210 and the Line Card 220. In some embodiments, the Line Cards 210 and/or 220 include one or more processors and/or memories (not shown in FIG. 2).

Similar to the Ethernet Ports 112-114 of the Gateway Device 110 (shown in FIG. 1), the Physical Ports 211-212 and 221-222 can be configured to communicate with Ethernet and/or Fibre Channel peripheral processing devices via an Ethernet Network. Additionally or alternatively, similar to the Fibre Channel Ports 116-118 (shown in FIG. 1), the Physical Ports 211-22 and 221-22 can be configured to communicate with Fibre Channel devices, such as Fibre Channel switches. For example, the Physical Ports 211-212 and 221-222 can implement a physical layer using twisted-pair electrical signaling via electrical cables or fiber-optic signaling via fiber-optic cables. In some embodiments, some of the Physical Ports 211-212 and 221-222 can implement one physical layer such as twisted-pair electrical signaling, and others of the Physical Ports 211-212 and 221-222 can implement a different physical layer, such as fiber-optic signaling. Furthermore, the Physical Ports 211-212 and 221-222 can be configured to allow the Gateway Device 200 to communicate with peripheral processing devices and/or switching devices via a common protocol such as Ethernet, Fibre Channel and/or FCoE. In some embodiments, some of the Physical Ports 211-212 and 221-222 can implement one protocol such as Ethernet/FCoE and others of the Physical Ports 211-212 and 221-222 can implement a different protocol such as Fibre Channel. Thus, the Gateway Device 200 can be in communication with multiple peripheral processing and/or switching devices using homogeneous or heterogeneous physical layers and/or protocols via the Physical Ports 211-212 and 221-222.

In some embodiments, the Gateway Device 200 can be configured to prepare a data frame or packet (e.g., an Ethernet or FCoE frame and/or packet) for transmission to a peripheral processing device (e.g., one of the Peripheral Processing Devices 122-124) or a Fibre Channel device (e.g., the Fibre Channel Switch 130). For example, the Frame Formatter Module 243 can be configured to forward, classify, and/or modify the frame encapsulation (e.g., modify, add and/or remove a header portion, footer portion and/or any other identifier included within the data frame) of a data frame prior to sending the data frame to a communications network. Additionally, the Frame Formatter Module 243 can be configured to partition and/or divide the data frame into data cells (e.g., having fixed length payloads) prior to sending the data cells to the switch fabric. Additional details related to frame and/or packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

In some embodiments, the Gateway Device 200 can be configured to define one or more filters, switching policies and/or rules that dictate how and to where data frames and/or packets are transmitted by the Gateway Device 200. For example, the Filter Module 241 stored at the Memory 240 can be configured to define a filter specifying that all data frames received from a particular logical or physical address should in turn be sent to a device or module having a specified logical or physical address. Alternatively, the Filter Module 241 can define a filter specifying that all data frames of a particular type (such as FCoE, Ethernet, or Fibre Channel) should be sent via one of a specified set of ports (such as one of the Fibre Channel Ports 116-118 shown in FIG. 1). In some embodiments, the Gateway Device 200 can be configured to route data frames and/or packets according to one or more filters. For example, the Switching Module 242 stored at the Memory 240 can send or forward an FCoE frame to a specified peripheral processing device based at least in part on a filter defined by the Filter Module 242.

Figure 3:
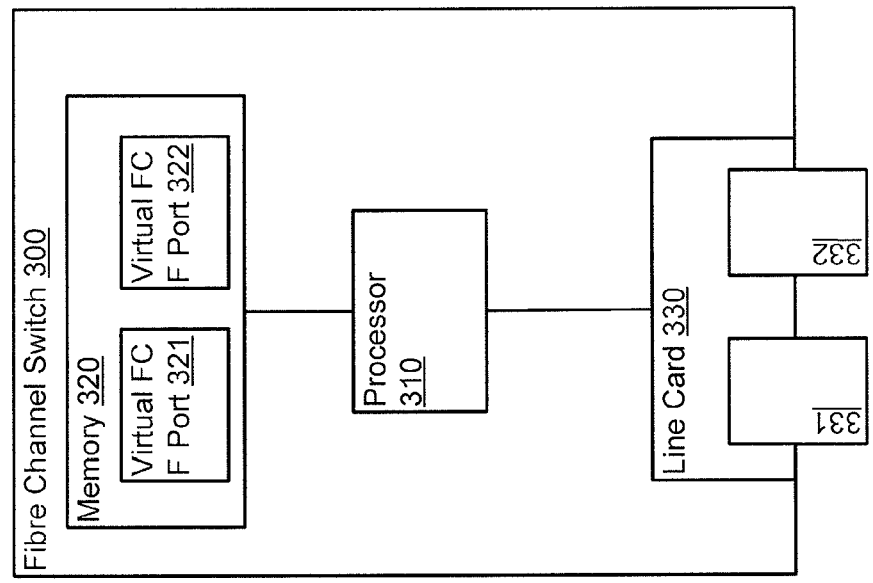
FIG. 3 is a schematic illustration of a Fibre Channel switch of a mixed Fibre Channel/Ethernet network portion, according to another embodiment.

FIG. 3 is a schematic illustration of a Fibre Channel switch, according to another embodiment. More specifically, FIG. 3 is a system block diagram of a Fibre Channel Switch 300 substantially similar to the Fibre Channel Switch 130 described in connection with FIG. 1 above, according to an embodiment. The Fibre Channel Switch 300 includes a Processor 310, a Memory 320, and a Line Card 330. The Line Card 330 includes Fibre Channel Ports 331 and 332. The Processor 310 is operatively coupled to the Memory 320 and the Line Card 330. The Memory 320 includes Virtual Fibre Channel F Port 321 and Virtual Fibre Channel F Port 322. The Fibre Channel Switch 300 can communicate with other Fibre Channel devices, such as an FCoE gateway (similar to the Gateway Device 110 shown in FIG. 1), via the Fibre Channel Ports 331 and 332.

In some embodiments, the Fibre Channel Switch 300 can perform typical network switching functions on Fibre Channel frames. The Fibre Channel Switch 300 can, for example, receive a Fibre Channel frame from a gateway device and route that Fibre Channel frame to an appropriate next-hop device within a Fibre Channel network to which the Fibre Channel Switch 300 is coupled. In some embodiments, the Fibre Channel Switch 300 can communicate with one or more peripheral processing devices (e.g., one of the Peripheral Processing Devices 322-324) via the Virtual Fibre Channel F Port 321 and/or the Virtual Fibre Channel F Port 322. For example, the Fibre Channel Switch 300 can send a Fibre Channel frame from the Virtual Fibre Channel F Port 321 for ultimate transmission to a virtual Fibre Channel N port instantiated at a peripheral processing device (e.g., the Virtual Fibre Channel N Port 173 instantiated at the Peripheral Processing Device 124 in FIG. 1).

Figure 4:
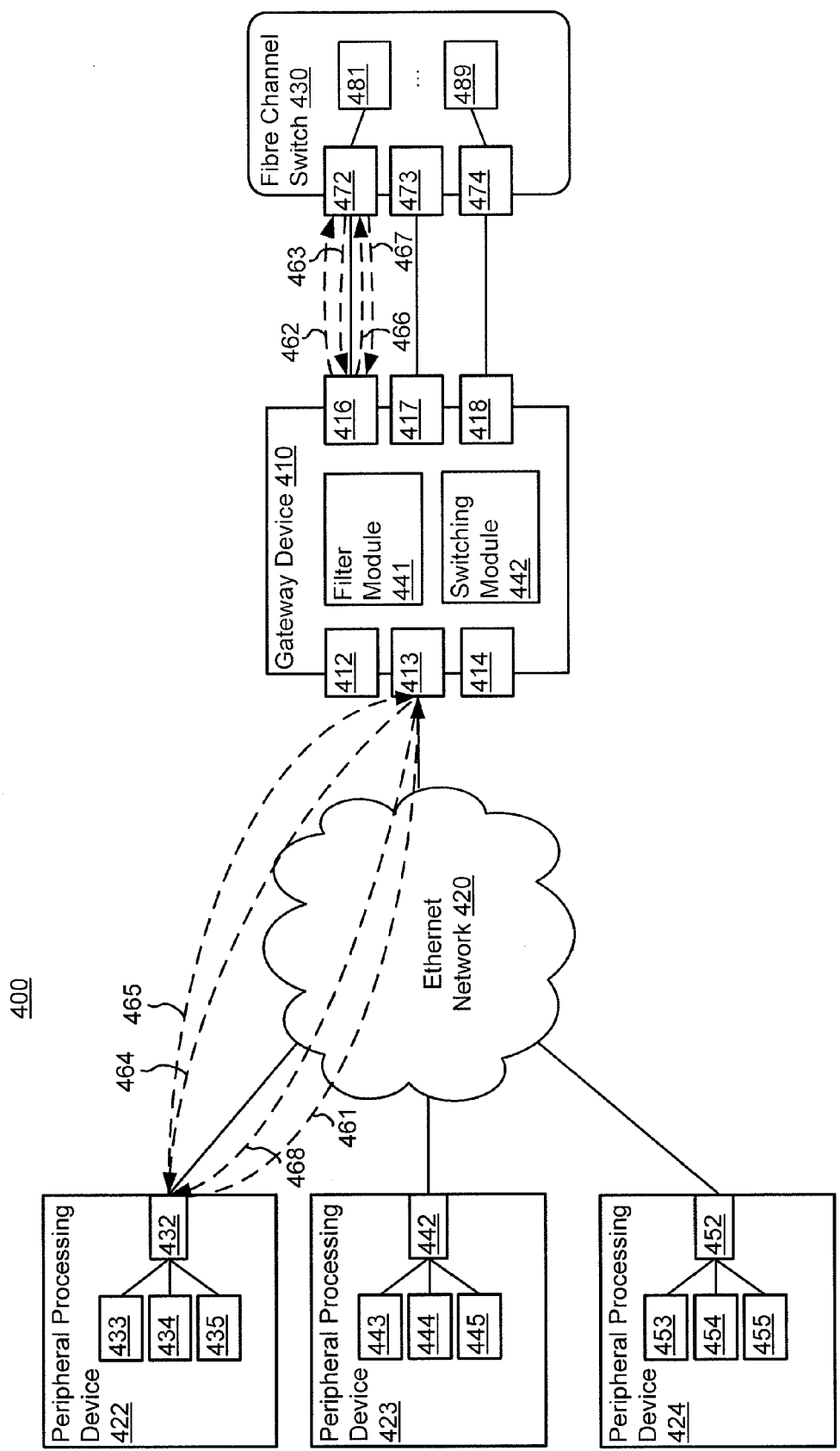
FIG. 4 is a schematic illustration of a mixed Ethernet/Fibre Channel network portion having a reduced number of filters for transmitting data from a Fibre Channel switch to one or more peripheral processing devices, according to another embodiment.

FIG. 4 is a schematic illustration of a mixed Ethernet/Fibre Channel network portion having a reduced number of filters for switching data frames from one or more peripheral processing devices to a Fibre Channel switch, according to an embodiment. More specifically, FIG. 4 illustrates a Network Portion 400 that includes a Gateway Device 410 physically and/or operatively coupled to Peripheral Processing Devices 422-424 (via an Ethernet Network 420 and Ethernet Ports 412-414) and a Fibre Channel Switch 430 (via Fibre Channel Ports 416-418). The Fibre Channel Switch 430 is operatively and/or physically coupled to the Gateway Device 410 via the Fibre Channel Ports 472-474. The Fibre Channel Switch 430 includes a set of Virtual Fibre Channel F Ports 481-489, each of which is operatively and/or physically coupled to at least one of the Fibre Channel Ports 472-474. The Peripheral Processing Devices 422-424 are operatively and/or physically coupled to the Gateway Device 410 via the FCoE Ports 432, 442 and 452, respectively, and to the Ethernet Network 420. The FCoE Ports 432, 442 and 452 are operatively coupled to the Virtual Fibre Channel N Ports 433-435, 443-445 and 453-455, respectively. Each of the Virtual Fibre Channel N Ports 433-435, 443-445 and 453-455 is uniquely and operatively coupled to one of the Virtual Fibre Channel F Ports 481-489 instantiated at the Fibre Channel Switch 430. In some embodiments, each of the above-described elements shown in FIG. 4 can be substantially similar to the like-named element(s) shown and described in connection with FIG. 1 above. In some embodiments, because the Gateway Device 410 can forward Fibre Channel traffic (often encapsulated in FCoE frames) between the Virtual Fibre Channel N Ports 433-435, 443-445 and 453-455 and the Fibre Channel Switch 430, the Gateway Device 410 can be identified by each of the Virtual Fibre Channel N Ports 433-435, 443-445 and 453-455 as a Fibre Channel switch device, similar to the Fibre Channel Switch 430. Similarly, the Gateway Device 410 can be identified by the Fibre Channel Switch 430 as multiple Fibre Channel peripheral processing devices and/or N ports, such as the Virtual Fibre Channel N Ports 433-435, 443-445 and 453-455.

In some embodiments, each of the FCoE Ports 432, 442 and 452 can receive a Fibre Channel fabric login request (such as a Fabric Login, or "FLOGI") request, from one of the Virtual Fibre Channel N Ports 433-435, 443-445 and 453-455, respectively, and send one or more signals to the Gateway Device 410 via the Ethernet Network 420. For example, as shown in FIG. 4, the FCoE Port 432 of the Peripheral Processing Device 422 can receive a Fibre Channel FLOGI request from the Virtual Fibre Channel N Port 433, define an FIP FLOGI request based on the received Fibre Channel FLOGI request and send a Signal 461 including the FIP FLOGI request to the Gateway Device 410. The FIP FLOGI request can be configured to request assignment of an FCID and/or MAC address to the Virtual Fibre Channel N Port 433 (i.e., the virtual Fibre Channel N Port from which the original Fibre Channel FLOGI request originated). In some embodiments, the FIP FLOGI request can include a desired MAC address assignment method requested by the Virtual Fibre Channel N Port 433. For example, the FIP FLOGI request can include a MAC address assignment method selection, such as Server Provided MAC Addresses (SPMA), Fabric Provided MAC Addresses (FPMA), or Extended Fabric Provided MAC Addresses (EFPMA). (Although SPMA and FPMA are generally known, the method for assigning the MAC address as described in connection with FIG. 4 below can be considered to illustrate, at least in part, an EFPMA-compatible MAC address assignment procedure.)

As shown in FIG. 4, the Gateway Device 410 can receive the Signal 461 at the Ethernet Port 413. The Gateway Device 410 can then send a Signal 462 to the Fibre Channel Switch 430. As also shown in FIG. 4, the Gateway Device 410 can send the Signal 462 via the Fibre Channel Port 416, and the Fibre Channel Switch 430 can receive the Signal 462 via the Fibre Channel Port 472. In some embodiments, the Signal 462 can include a Fibre Channel (i.e., non-FIP) FLOGI request based at least in part on the FIP FLOGI request originally included in the Signal 461.

Upon receiving the Fibre Channel FLOGI request included in the Signal 462, the Fibre Channel Switch 430 can assign both an FCID and a MAC address to the Virtual Fibre Channel N Port 433. The FCID can be a 24-bit string that includes an 8-bit domain ID associated with the Mixed Network Portion 400 and/or the Fibre Channel Switch 430. The FCID can also include an 8-bit area ID associated with one or more ports from the Fibre Channel Ports 472-474 of the Fibre Channel Switch 430. The FCID can also include an 8-bit port ID associated with the Virtual Fibre Channel N Port 433.

In some embodiments, the MAC address can be 48 bits in length, and can be comprised of various component parts. For example, the MAC address can include, in the first 24 bits, a 24-bit Fibre Channel mapping value (or "FC-MAP"). The Fibre Channel mapping value can be unique to a given switch fabric system. In some embodiments, the Fibre Channel mapping value can be an OUI associated with the Network Portion 400. The MAC address can further include, in the second 24 bits, the FCID of whichever virtual Fibre Channel N port instantiated at the Peripheral Processing Device 422 was the first to be assigned an FCID. Thus, if the Virtual Fibre Channel N Port 433 is the first virtual Fibre Channel N port from the Virtual Fibre Channel N Ports 433-435 to be assigned an FCID from the Fibre Channel Switch 430, the MAC address can include, in the second 24 bits, the FCID assigned to the Virtual Fibre Channel N Port 433 (as described above). If, however, the Virtual Fibre Channel N Port 433 is not the first virtual Fibre Channel N port from the Virtual Fibre Channel N Ports 433-435 to receive an FCID from the Fibre Channel Switch 430, the MAC address can include, in the second 24 bits, the FCID of whichever virtual Fibre Channel N port from the Virtual Fibre Channel N Ports 434-435 was the first to be assigned an FCID by the Fibre Channel Switch 430. As such, each of the Virtual Fibre Channel N Ports 433-435 can be assigned an identical MAC address (based on the common 24-bit Fibre Channel mapping and common 24-bit FCID of the first virtual Fibre Channel N port to log into the Fibre Channel Switch 430). Thus, it can be determined for any virtual Fibre Channel N port present within the Network Portion 400 whether that virtual Fibre Channel N port is one of the Virtual Fibre Channel N Ports 433-435 instantiated at the Peripheral Processing Device 422, given that all the Virtual Fibre Channel N Ports 433-435 are associated with the same MAC address.

Having defined the MAC address for the Virtual Fibre Channel N Port 433, the Fibre Channel Switch 430 can send a Signal 463 to the Gateway Device 410 via the Fibre Channel Port 472. As shown in FIG. 4, the Gateway Device 410 can receive the Signal 463 via the Fibre Channel Port 416. In some embodiments, the Signal 463 can be a Fibre Channel (i.e., non-FIP) FLOGI response that includes both the MAC address and FCID assigned to the Virtual Fibre Channel N Port 433. Alternatively, in some embodiments the Fibre Channel Switch 430 can define and assign an FCID to the Virtual Fibre Channel N Port 433, but not a MAC address. In such embodiments, the Signal 463 can include this assigned FCID, and upon receipt of the Signal 463 the Gateway Device 410 can define a MAC address to the Virtual Fibre Channel Port 433 as described above.

Upon receipt of the Signal 463 including the MAC address for the Virtual Fibre Channel N Port 433, the Gateway Device 410 can define a filter associated with the Virtual Fibre Channel N Port 433 and the Peripheral Processing Device 422. More specifically, the Filter Module 441 of the Gateway Device 410 can associate, with the Ethernet Port 413, a filter based at least in part on the MAC address assigned to the Virtual Fibre Channel N Port 433 (included in the Signal 463). In some embodiments, the filter can specify that the Switching Module 442 send to the Fibre Channel Switch 430 any Fibre Channel frame encapsulated in a received FCoE frame that includes a source MAC address matching the MAC address assigned to the Virtual Fibre Channel N Port 433. The filter can optionally specify that the FCoE and/or Ethernet frame includes a specified EtherType, such as an FCoE EtherType. The filter can also optionally specify that the FCoE and/or Ethernet frame includes a specified destination address, such as a MAC address of the Gateway Device 410 or the Fibre Channel Switch 430. The filter can also optionally specify that any received FCoE frame including the source MAC address is to be received from the FCoE Port 432. In this manner, the application of the filter can enable the Gateway Device 410 to prevent MAC address spoofing (further described in connection with FIG. 7 below). In some embodiments, the Filter Module 441 can store the defined filter at a memory. The memory can be, for example a Ternary Content-addressable Memory (TCAM) included in or operatively and/or physically coupled to the Gateway Device 410.

Having defined the filter as described above, the Gateway Device 410 can send, to the Virtual Fibre Channel N Port 433, an FIP FLOGI response including both the assigned MAC address and the FCID. More specifically, the Gateway Device 410 can send a Signal 464 via the Ethernet Port 413, the Ethernet Network 420 and the FCoE port 432. The Signal 464 can be received at the FCoE port 432. Upon arrival at the FCoE Port 432, the Peripheral Processing Device 422 can send, to the Virtual Fibre Channel N Port 433, a Fibre Channel fabric login response, the response including the assigned MAC address and the assigned FCID.

Having defined the proper addressing and filter rules for the Virtual Fibre Channel N Port 433, the Gateway Device 410 can receive a second FIP login request based on a second Fibre Channel fabric login request, sent from a second virtual Fibre Channel N port. More specifically, as shown in FIG. 4, the Virtual Fibre Channel N Port 434 can send a Signal 465 to the Ethernet Port 413 of the Gateway Device 410, the Signal 465 being sent via the FCoE Port 432 and the Ethernet Network 420. In some embodiments, the Signal 465 can include a FIP Fabric Discovery (FDISC) request associated with the Virtual Fibre Channel N Port 434. The FIP FDISC request can be configured to request assignment of an FCID and/or MAC address to the Virtual Fibre Channel N Port 434. In some embodiments, the FIP FDISC request can include a desired MAC address assignment method, such as SPMA, FPMA or EFPMA.

As shown in FIG. 4, the Gateway Device 410 can receive the Signal 465 at the Ethernet Port 413 and send a Signal 466 to the Fibre Channel Switch 430. As also shown in FIG. 4, the Gateway Device 410 can send the Signal 466 via the Fibre Channel Port 416, and the Fibre Channel Switch 430 can receive the Signal 466 via the Fibre Channel Port 472. In some embodiments, the Signal 466 can include a Fibre Channel (i.e., non-FIP) FDISC request based at least in part on the FIP FDISC request originally included in the Signal 465.

Upon receiving the Fibre Channel (i.e., non-FIP) FDISC request included in the Signal 465, the Fibre Channel Switch 430 can assign both an FCID and a MAC address to the Virtual Fibre Channel N Port 434. As discussed above, the FCID can be a 24-bit string that includes an 8-bit domain ID associated with the Mixed Network Portion 400 and/or the Fibre Channel Switch 430. The FCID can also include an 8-bit area ID associated with one or more ports from the Fibre Channel Ports 472-474 of the Fibre Channel Switch 430. The FCID can also include an 8-bit port ID associated with the Virtual Fibre Channel N Port 434. As also discussed above, the MAC address can be the same MAC address already assigned to the Virtual Fibre Channel Port 433.

Having defined the MAC address for the Virtual Fibre Channel N Port 434, the Fibre Channel Switch 430 can send a Signal 467 to the Gateway Device 410 via the Fibre Channel Port 472. As shown in FIG. 4, the Gateway Device 410 can receive the Signal 467 via the Fibre Channel Port 416. In some embodiments, the Signal 467 can be a Fibre Channel FDISC response that includes both the MAC address and FCID assigned to the Virtual Fibre Channel N Port 434. Alternatively, in some embodiments the Fibre Channel Switch 430 can define and assign an FCID to the Virtual Fibre Channel N Port 434, but not a MAC address. In such embodiments, the Signal 467 can include this assigned FCID, and upon receipt of the Signal 467 the Gateway Device 410 can define a MAC address to the Virtual Fibre Channel Port 434 as described above.

Upon receipt of the Signal 467 including the MAC address for the Virtual Fibre Channel N Port 434, the Gateway Device 410 can determine whether a filter already exists for the MAC address assigned to the Virtual Fibre Channel N Port 434. More specifically, the Filter Module 441 of the Gateway Device 410 can perform a lookup or other query based at least in part on the assigned MAC address. Because such a filter does already exist (as discussed above in connection with Signals 461-463), the Filter Module 441 can refrain from defining a separate filter associated with the Virtual Fibre Channel N Port 434. Thus, because both the Virtual Fibre Channel N Ports 433 and the Virtual Fibre Channel N Port 434 are assigned the same MAC address, the Gateway Device 410 can use the already-defined filter to handle switching of all FCoE and/or Ethernet frames sent from any of the Virtual Fibre Channel N Ports 433-434 (via the FCoE port 432).

Having defined the filter as described above, the Gateway Device 410 can send, to the Virtual Fibre Channel N Port 434, an FIP FDISC response including both the MAC address and the FCID assigned to the Virtual Fibre Channel N Port 434. More specifically, the Gateway Device 410 can send a Signal 468 via the Ethernet Port 413, the Ethernet Network 420 and the FCoE port 432. The Signal 468 can be received at the FCoE port 432. Upon arrival at the FCoE Port 432, the Peripheral Processing Device 422 can send, to the Virtual Fibre Channel N Port 434, a Fibre Channel FDISC response, the FDISC response including the MAC address and FCID assigned to the Virtual Fibre Channel N Port 434.

Figure 5:
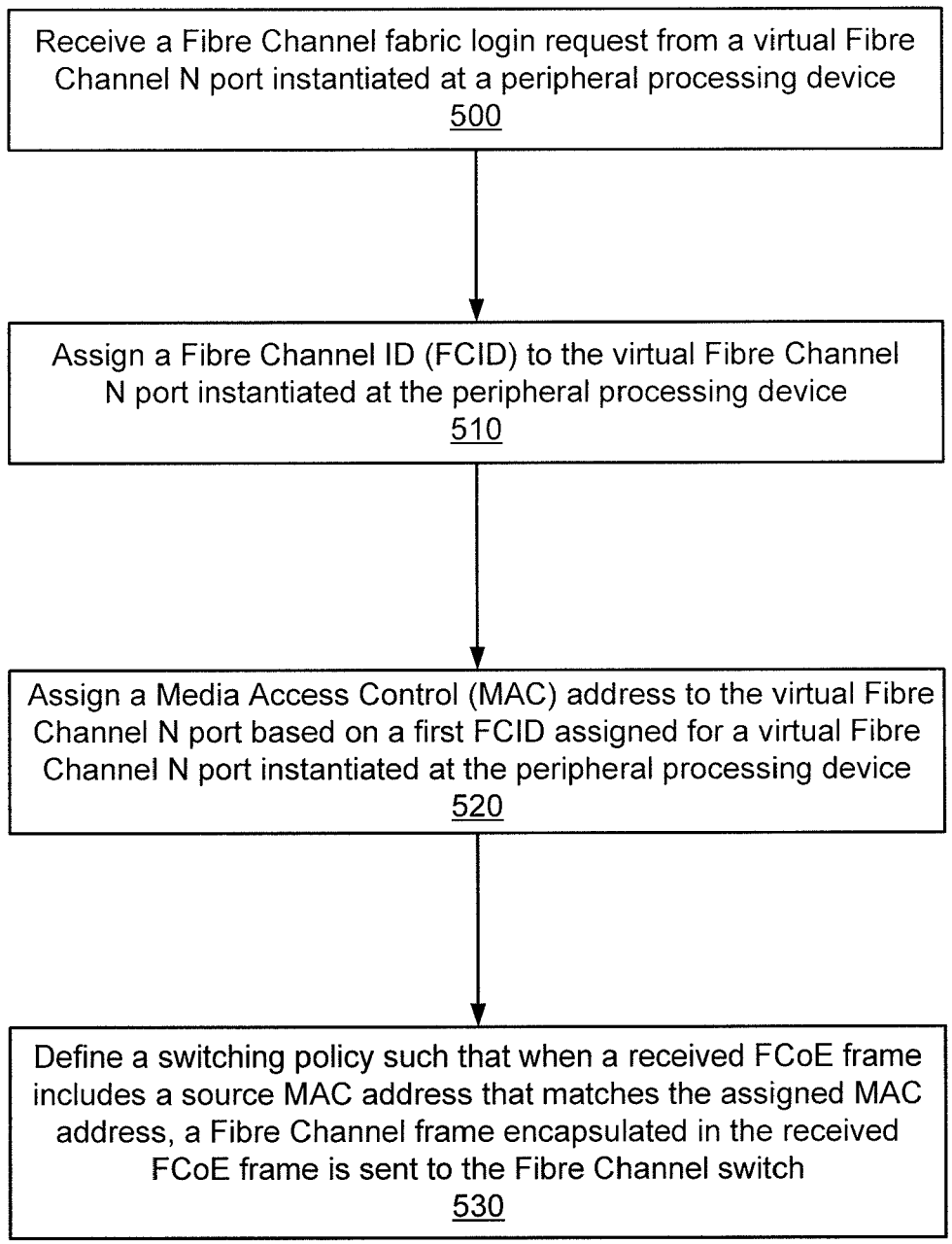
FIG. 5 is a flow chart that illustrates a method of defining a switching policy based at least in part on a single MAC address assigned to multiple virtual ports instantiated at a peripheral processing device, according to another embodiment.

FIG. 5 is a flow chart that illustrates a method of defining a switching policy based at least in part on a single MAC address assigned to multiple virtual ports instantiated at a peripheral processing device, according to another embodiment.

A Fibre Channel switch can receive a Fibre Channel fabric login request originally sent from a virtual Fibre Channel N port instantiated at a peripheral processing device, at 500. In some embodiments, the Fibre Channel switch can be any standard Fibre Channel switch, such as the Fibre Channel Switch 300 discussed in connection with FIG. 3 above and/or the Fibre Channel Switch 430 discussed in connection with FIG. 4 above. The peripheral processing device can be a Fibre Channel peripheral processing device and/or server operatively coupled to the Fibre Channel switch via a gateway device, such as an FCoE gateway (e.g., the Gateway Device 110 from FIG. 1). The Fibre Channel fabric login request can be, for example, a Fibre Channel FLOGI or FDISC request configured to request an FCID and/or a MAC address for the virtual Fibre Channel N port.

In response to the received Fibre Channel fabric login request, the Fibre Channel switch can assign an FCID to the virtual Fibre Channel N port instantiated at the Fibre Channel device, at 510. The FCID can be defined based at least in part on a domain ID and/or an area ID associated with the Fibre Channel switch. The FCID can be further defined based at least in part on a port ID associated with a particular Fibre Channel port from the Fibre Channel ports of the Fibre Channel switch. In some embodiments, the FCID can be a 24-bit string including an 8-bit domain ID, followed by an 8-bit area ID, followed by an 8-bit port ID.

The Fibre Channel switch can next assign a MAC address to the virtual Fibre Channel N port instantiated at the peripheral processing device, at 520. The MAC address can be defined based at least in part on a 24-bit Fibre Channel mapping associated with the Fibre Channel switch. In some embodiments, the 24-bit Fibre Channel mapping can be based at least in part on an OUI associated with the switch fabric system of which the Fibre Channel switch is a part. The MAC address can be further defined based at least in part on an FCID. In some embodiments, the assigned MAC address can be a 48-bit string that includes the 24-bit Fibre Channel mapping in the first 24 bits. The MAC address can also include the 24-bit FCID of a first virtual Fibre Channel N port from the Fibre Channel device to be assigned an FCID by the Fibre Channel switch. If the requesting virtual Fibre Channel N port is the first virtual Fibre channel N point instantiated at the Fibre Channel device to request a MAC address, the 24-bit FCID can be the FCID just assigned for that virtual Fibre Channel N port by the Fibre Channel switch. Having defined the FCID and MAC address as described above, the Fibre Channel switch can send a Fibre Channel fabric login response to the gateway device, the Fibre Channel fabric login response including both the FCID and the MAC address.

The gateway device can next define a switching policy allowing transmission of a Fibre Channel frame encapsulated in an FCoE frame to the Fibre Channel switch when a source MAC address included in the FCoE frame matches the assigned MAC address, at 530. More specifically, in some embodiments, the gateway device can receive, from the Fibre Channel switch, a signal including the assigned MAC address and/or the assigned FCID. In such embodiments, the gateway device can include a filter module similar to the Filter Module 441 discussed in connection with FIG. 4 above. The filter module can next define a switching policy or filter indicating that when a received FCoE frame includes a source MAC address matching the MAC address assigned to the requesting virtual Fibre Channel N port, a Fibre Channel frame encapsulated in the received FCoE frame should be sent to the Fibre Channel switch. In this manner, the single switching policy or filter (i.e., one switching policy or filter per peripheral processing device) can provide correct switching of all frames sent to the Fibre Channel switch from any virtual Fibre Channel N port instantiated at the peripheral processing device.

Figure 6:
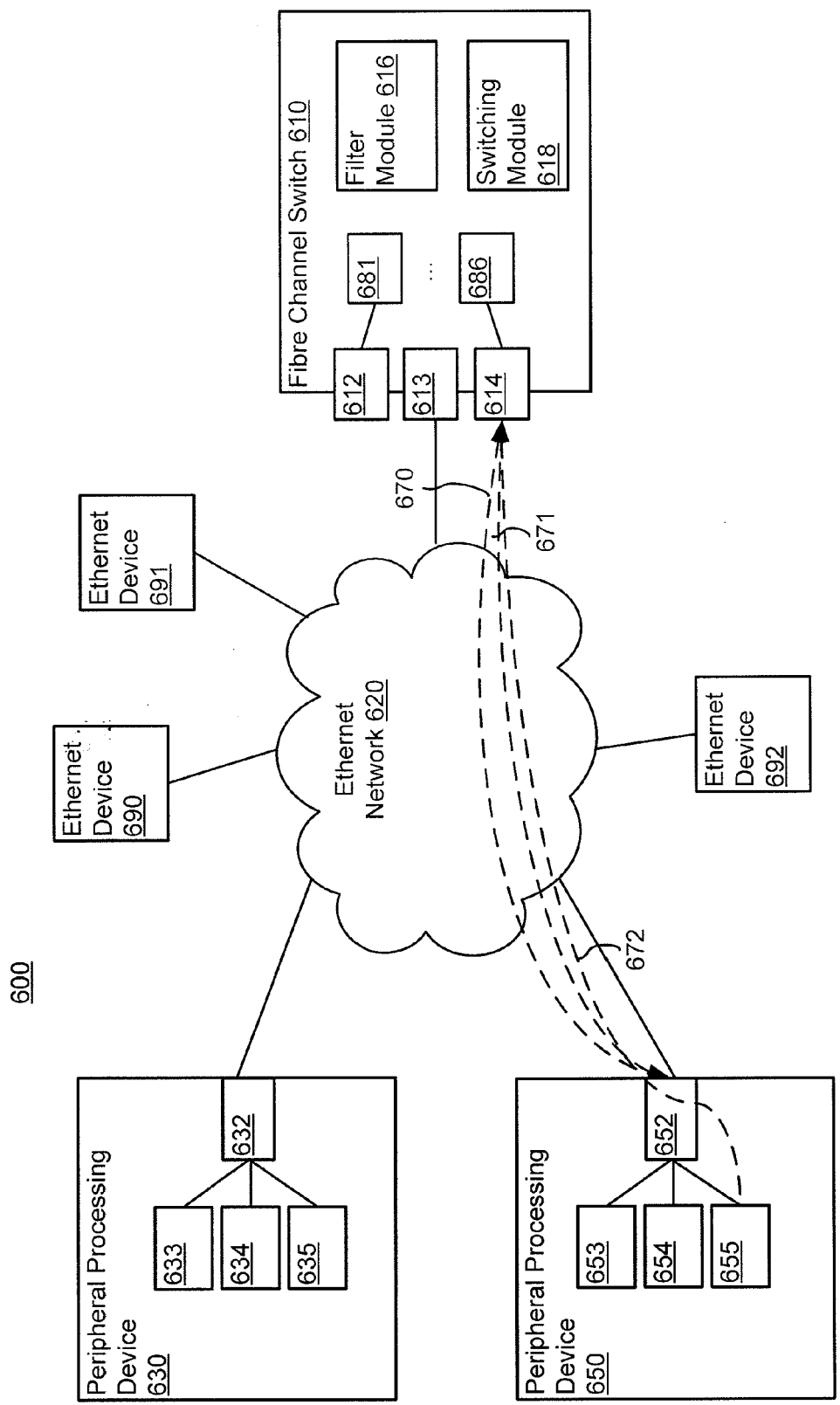
FIG. 6 is a schematic illustration of a mixed Ethernet/Fibre Channel network portion having a reduced number of filters for transmitting data from a Fibre Channel switch to one or more peripheral processing devices, according to another embodiment.

FIG. 6 is a schematic illustration of a mixed Ethernet/Fibre Channel network portion having a reduced number of filters for transmitting data from one or more peripheral processing devices to a Fibre Channel switch. More specifically, FIG. 6 illustrates a Network Portion 600 that includes a Fibre Channel Switch 610 coupled to Peripheral Processing Devices 630 and 650 (via an Ethernet Network 620 and FCoE Ports 612-614). The Fibre Channel Switch 610 includes a set of Virtual Fibre Channel F Ports 681-686, each of which is operatively coupled to one or more of the FCoE Ports 612-614. The Peripheral Processing Devices 630 and 650 are operatively and/or physically coupled to the Fibre Channel Switch 610 via the FCoE Ports 632 and 652, respectively, and the Ethernet Network 620. The FCoE Ports 632 and 652 are operatively coupled to the Virtual Fibre Channel N Ports 633-635 and 653-655, respectively. Each of the Virtual Fibre Channel N Ports 633-635 and 653-655 is uniquely and operatively coupled to one of the Virtual Fibre Channel F Ports 681-686 instantiated at the Fibre Channel Switch 610. The Ethernet Network 620 is additionally, operatively coupled to the Ethernet Devices 690, 691 and 692.

In some embodiments, each of the above-described elements shown in FIG. 6 can be substantially similar to the like-named element(s) shown and described in connection with FIGS. 1 and 4 above. Each of the Ethernet Devices 690, 691 and 692 can be a server device configured to exchange information with one or more Ethernet devices included in the Switch Fabric System 600. Each of the Ethernet Devices 690, 691 and 692 can include, for example, a Network Interface Card (NIC) configured to exchange Ethernet frames with one or more other Ethernet devices via the Ethernet Network 620.

The Fibre Channel Switch 610 can perform both substantially the same functions as the Fibre Channel Switch 430 discussed in connection with FIG. 4 above, as well as substantially the same functions as the Gateway Device 410 discussed in connection with FIG. 4. To do so, the Fibre Channel Switch 610 includes both the Filter Module 616 and Switching Module 618 described above, as well as the set of FCoE Ports 612-614, The FCoE Ports 612-614 being used to exchange information across the Ethernet Network 620.

In some embodiments, each of the FCoE Ports 632 and 652 can receive a Fibre Channel login (FLOGI or FDISC) request from one of the Virtual Fibre Channel N Ports 633-635 and 653-655, respectively. The relevant FCoE Port from the FCoE Ports 632 and 652 can then send one or more signals to the Fibre Channel Switch 610 via the Ethernet Network 620. For example, as shown in FIG. 6, the FCoE Port 652 of the Peripheral Processing Device 650 can receive a Fibre Channel login request from the Virtual Fibre Channel N Port 655 and send a Signal 670 to the Fibre Channel Switch 610 via the FCoE Port 614. The Signal 670 can include an FCoE-packaged version of the login request, such as an FIP request. The FIP request can be, for example, a FLOGI request that requests assignment of a MAC address to the Virtual Fibre Channel N Port 655 (i.e., the virtual Fibre Channel N Port from which the FIP request originated).

Upon receiving the FIP request included in the Signal 670, the Fibre Channel Switch 610 can assign an FCID and a MAC address to the Virtual Fibre Channel N Port 655. The FCID can be defined based at least in part on a domain ID and/or an area ID associated with the Fibre Channel Switch 610. The FCID can be further defined based at least in part on a port ID associated with a particular Fibre Channel port from the Fibre Channel Ports 612-614. In some embodiments, the FCID can be a 24-bit string including an 8-bit domain ID, followed by an 8-bit area ID, followed by an 8-bit port ID.

In some embodiments, the MAC address can be 48 bits in length, and can comprise various portions. For example, the assigned MAC address can include, in the first 24 bits, a Fibre Channel mapping, such as an OUI associated with the Fibre Channel Switch 610. The MAC address can also include a 24-bit FCID of a first virtual Fibre Channel N port from the Peripheral Processing Device 630 to be assigned an FCID by the Fibre Channel Switch 610. If the Virtual Fibre Channel N Port 655 is the first virtual Fibre Channel N port from the Peripheral Processing Device 630 to be assigned an FCID, the 24-bit FCID included in the MAC address can be the FCID assigned to the Virtual Fibre Channel N Port 655 (described above).

Having defined the MAC address for the Virtual Fibre Channel N Port 655, the Fibre Channel Switch 610 can define a filter associated with the Virtual Fibre Channel N Port 655 and the Peripheral Processing Device 650. More specifically, the Filter Module 616 of the Fibre Channel Switch 610 can define a filter based at least in part on the assigned MAC address. In some embodiments, the filter can specify that all Fibre Channel, Ethernet and/or FCoE frames including a source MAC address that matches the assigned MAC address be received by the Switching Module 618 of the Fibre Channel Switch 610. In this manner, the Fibre Channel Switch 610 can allow for switching of all data frames sent from any of the Virtual Fibre Channel N Ports 653-655 using a single filter. In some embodiments, the filter can specify and/or allow that all Fibre Channel, Ethernet and/or FCoE frames not including a source MAC address that matches the assigned MAC address be dropped and/or not received by the Switching Module 618 of the Fibre Channel Switch 610.

Having defined the filter as described above, the Fibre Channel Switch 610 can send an FIP response to the Virtual Fibre Channel N Port 655. The FIP response can include, for example, the assigned MAC address and/or the assigned FCID. More specifically, the Fibre Channel Switch 610 can send a Signal 671 via the FCoE Port 614, the Ethernet Network 620 and the FCoE port 652. In some embodiments, the Signal 671 can be an FCoE frame including the FIP response. The Signal 671 can be received at the FCoE port 652. Upon arrival at the FCoE Port 652, the Peripheral Processing Device 650 can remove the FCoE header from the Signal 671 and send, to the Virtual Fibre Channel N Port 655, a signal including the assigned MAC address and FCID.

Figure 7:
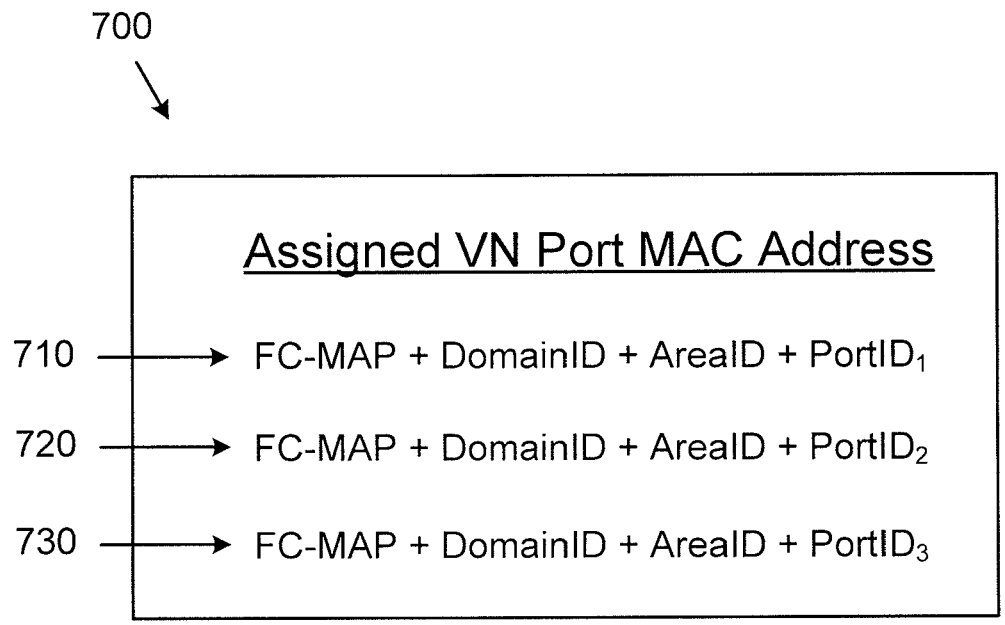
FIG. 7 is a diagram that illustrates a switching table including multiple filters, each of the filters being uniquely associated with a single MAC address assigned to all virtual ports instantiated at a peripheral processing device, according to another embodiment.

As also shown in FIG. 6, the Virtual Fibre Channel N Port 655 can send a Fibre Channel frame to the Fibre Channel Switch 610 via a Signal 672. More specifically, the Virtual Fibre Channel N Port 655 can define and send a Fibre Channel frame to the FCoE Port 652 for encapsulation within an FCoE frame and transmission to the Fibre Channel Switch 610. The FCoE frame can be transmitted to the Fibre Channel Switch 610 via the Ethernet Network 620 and the FCoE Port 614. Upon receipt of the FCoE frame from the FCoE Port 652, the Switching Module 618 of the Fibre Channel Switch 610 can apply the filter defined above to the FCoE frame. More specifically, the Switching Module 618 can determine that a source MAC address included in the FCoE frame matches the assigned MAC address described above. Having made this determination, the Switching Module 618 can extract the Fibre Channel frame encapsulated in the FCoE frame and receive the Fibre Channel frame for further handling. FIG. 7 is a diagram that illustrates a list of assigned VN port MAC addresses, each associated with a virtual Fibre Channel N port, according to another embodiment. More specifically, FIG. 7 illustrates an Assigned MAC Address List 700 that includes Assigned VN Port MAC Addresses 710, 720 and 730. Each of the Assigned VN Port MAC Addresses 710, 720 and 730 is a unique MAC address assigned to one or more virtual ports instantiated at a peripheral processing device within a network. Each unique MAC address can be a source MAC address included in an FCoE frame defined for transmission from a peripheral processing device to a Fibre Channel switch, via an FCoE gateway. As shown in FIG. 7, each of the Assigned VN Port MAC Addresses 710, 720 and 730 includes a common FC-MAP, a common DomainID and a common AreaID. As also shown in FIG. 7, the Assigned VN Port MAC Address 710 includes a f PortID$_1$ associated with a virtual Fibre Channel N port instantiated at a first peripheral processing device. The Assigned VN Port MAC Address 720 includes a second PortID$_2$ associated with a virtual Fibre Channel N port instantiated at a second peripheral processing device. The Assigned VN Port MAC Address 730 includes a third PortID$_3$ associated with a virtual Fibre Channel N port instantiated at a third peripheral processing device.

In some embodiments, the Assigned MAC Address List 700 can be included in and/or referenced by a gateway device and/or a network switch, such as the Gateway Device 110 and/or the Fibre Channel Switch 130 discussed in connection with FIG. 1 above. In such embodiments, the Assigned MAC Address List 700 can be used by the gateway device and/or the network switch to switch data frames, such as Ethernet and/or FCoE data frames. For example, a gateway device can receive an FCoE frame from, for example, a peripheral processing device. Based at least in part on a source MAC address included in the FCoE frame and the Assigned MAC Address List 700, the gateway device can determine whether a Fibre Channel frame encapsulated in the FCoE frame should be forwarded on to a Fibre Channel switch. More specifically, if the source MAC address included in an FCoE frame is also included in the Assigned MAC Address List 700, the FCoE gateway can determine that the encapsulated Fibre Channel frame should be sent to the Fibre Channel switch. If the source MAC address included in the FCoE frame is not included in the Assigned MAC Address List 700, the FCoE gateway can determine that the FCoE frame has been received from an unknown source, and can drop and/or otherwise reject the FCoE frame.

Although not shown in FIG. 7, in some embodiments, the Assigned MAC Address List 700 can include a second column listing a source FCoE port associated with each assigned VN port MAC address. For example, the second column could list an identifier (such as a MAC address) of an FCoE port included on a peripheral processing device at which one or more virtual Fibre Channel N ports is instantiated, each of the virtual Fibre Channel N ports having been assigned the VN port MAC address associated with that FCoE port. In such embodiments, upon receipt of an FCoE frame from a given FCoE port, the FCoE gateway can verify 1) that the source MAC address included in the FCoE frame is likewise included in the Assigned MAC Address List 700 (as described above) and 2) that the FCoE port from which the FCoE frame was received is in fact the FCoE port associated with that source MAC address in the Assigned MAC Address List 700. In this manner, the FCoE gateway can ensure that each received FCoE frame both includes a valid source MAC address and was sent from the FCoE port with which that source MAC address is associated. If not, the FCoE gateway can drop or otherwise reject the FCoE frame. Thus, the FCoE gateway can prevent MAC address "spoofing", where a virtual Fibre Channel N port instantiated at a peripheral processing device and not associated with a given source MAC address sends an FCoE frame with that source MAC address so as to misrepresent itself as the actual virtual Fibre Channel N port that is in fact associated with that source MAC address.

Figure 8:
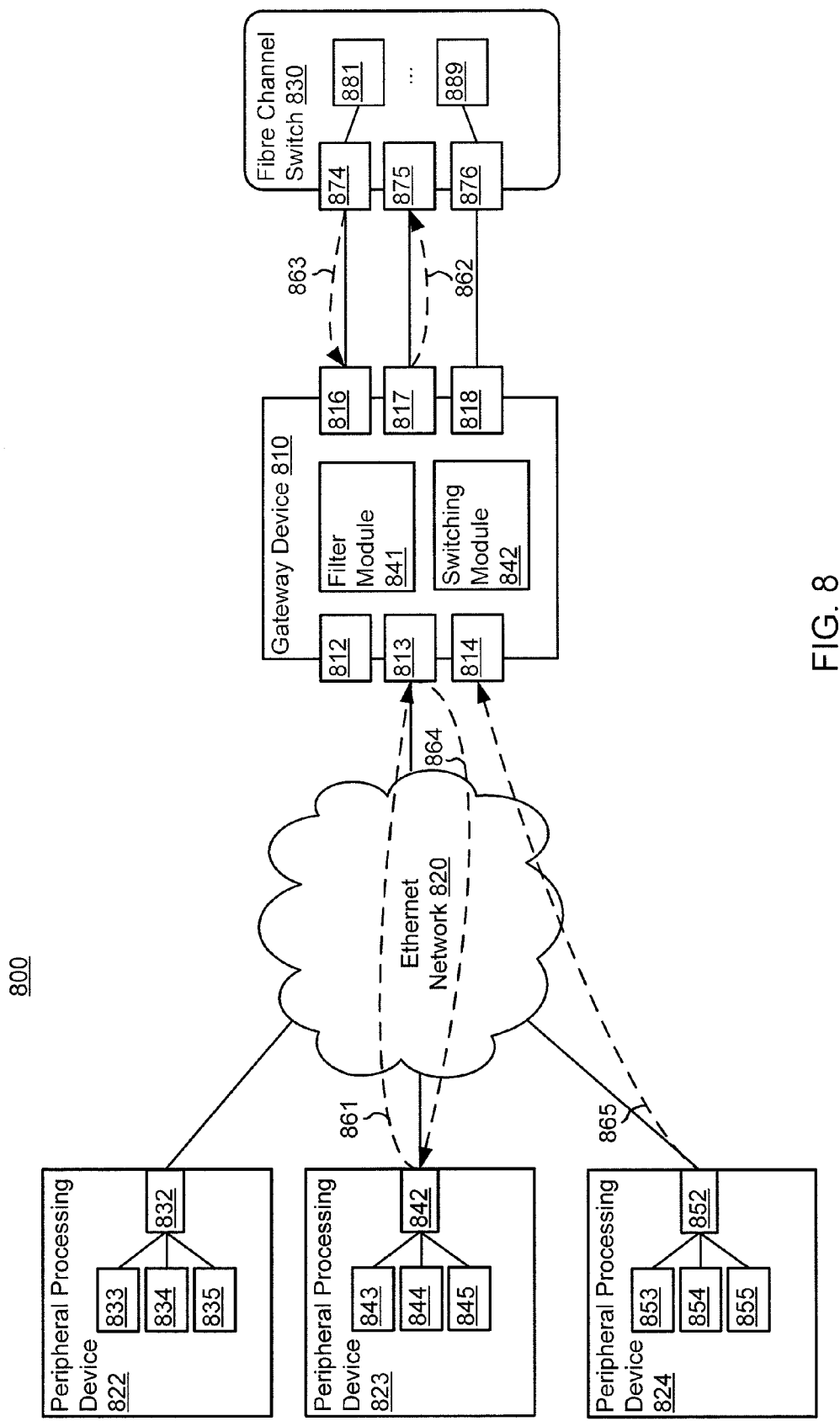
FIG. 8 is a schematic illustration of mixed Ethernet/Fibre Channel network portion having one or more filters that prevent transmission of data frames with a spoofed MAC address, according to another embodiment.

FIG. 8 is a schematic illustration of mixed Ethernet/Fibre Channel network portion having one or more filters that prevent transmission of data frames with a spoofed MAC address, according to another embodiment. More specifically, FIG. 8 illustrates a Network Portion 800 that includes a Gateway Device 810 physically and/or operatively coupled to Peripheral Processing Devices 822-824 and a Fibre Channel Switch 830. The Fibre Channel Switch 830 is operatively and/or physically coupled to the Gateway Device 810 via the Fibre Channel Ports 874-876. The Fibre Channel Switch 830 includes a set of Virtual Fibre Channel F Ports 881-889, each of which is operatively and/or physically coupled to at least one of the Fibre Channel Ports 874-876. The Peripheral Processing Devices 822-824 are operatively and/or physically coupled to the Gateway Device 810 via the FCoE Ports 832, 842 and 852, respectively, and to the Ethernet Network 820. The FCoE Ports 832, 842 and 852 are operatively coupled to the Virtual Fibre Channel N Ports 833-835, 843-845 and 853-855, respectively. Each of the Virtual Fibre Channel N Ports 833-835, 843-845 and 853-855 is uniquely and operatively coupled to one of the Virtual Fibre Channel F Ports 881-889 instantiated at the Fibre Channel Switch 430. In some embodiments, each of the above-described elements shown in FIG. 4 can be substantially similar to the like-named element(s) shown and described in connection with FIG. 1 above.

A virtual Fibre Channel N Port such as the Virtual Fibre Channel N Port 843 can request and be assigned a MAC address and FCID from the Gateway Device 810 and/or the Fibre Channel Switch 830. Although not shown in FIG. 8, the Virtual Fibre Channel N Port 843 can send a signal to the FCoE Port 842, the signal including a Fibre Channel fabric login request, such as a Fibre Channel FLOGI request configured to request a MAC address and FCID. Based on the received Fibre Channel FLOGI request, the Peripheral Processing Device 823 can send a Signal 861 to the Gateway Device 810 via the FCoE Port 842, the Ethernet Network 820 and the Ethernet Port 813. In some embodiments, the Signal 861 can include a FIP FLOGI request based on the Fibre Channel FLOGI request originally defined by the Virtual Fibre Channel N Port 843. As also shown in FIG. 8, the Gateway Device 810 can send a Signal 862 to the Fibre Channel Switch 830 via the Fibre Channel Port 817 of the Gateway Device 810 and the Fibre Channel Port 875 of the Fibre Channel Switch 830. In some embodiments, the Signal 862 can include a Fibre Channel FLOGI request based at least in part on the FIP FLOGI request.

Upon receipt of the Signal 862, the Fibre Channel Switch 830 can assign an FCID and a MAC address to the Virtual Fibre Channel N Port 843. In some embodiments, the Fibre Channel Switch 830 can do so in a similar fashion as the Fibre Channel Switch 430 discussed in connection with FIG. 4 above. Having defined and assigned the MAC address and FCID for the Virtual Fibre Channel N Port 843, the Fibre Channel Switch 830 can send a Signal 863 to the Gateway Device 810 via the Fibre Channel Port 874 of the Fibre Channel Switch 830 and the Fibre Channel Port 816 of the Gateway Device 816. In some embodiments, the Signal 863 can include a Fibre Channel FLOGI response that includes the assigned MAC address and FCID for the Virtual Fibre Channel N Port 433.

Upon receipt of the Signal 863 including the MAC address for the Virtual Fibre Channel N Port 433, the Gateway Device 810 can define a filter associated with the Virtual Fibre Channel N Port 843. More specifically, the Filter Module 841 of the Gateway Device 810 can define a filter based at least in part on the MAC address assigned to the Virtual Fibre Channel N Port 843 (included in the Signal 463). In some embodiments, the filter can specify that all FCoE and/or Ethernet frames received from the Peripheral Processing Devices 823 include a source MAC address matching the MAC address assigned to the Virtual Fibre Channel N Port 843. In this manner, the Gateway Device 810 can prevent MAC address spoofing by ensuring that all FCoE frames received at the Gateway Device 810 from the Peripheral Processing Device 823 have been sent by a valid virtual Fibre Channel N port having a known assigned MAC address. In some embodiments, the filter can direct the Gateway Device 810 to drop any received Ethernet and/or FCoE frames that include a source MAC address that fails to match a MAC address assigned to a valid virtual Fibre Channel N port from the Virtual Fibre Channel N Ports 833-835, 843-845 and 853-855, and more specifically to drop any received FCoE frame received from the Peripheral Processing Device 823 that does not include the source MAC address assigned to the Virtual Fibre Channel N Port 843.

In some embodiments, the Filter Module 841 can instead or additionally define a second filter. The second filter can, for example, direct the Gateway Device 810 to inspect a source FCID ("S ID") included in a Fibre Channel frame encapsulated in a received FCoE frame. The second filter can further direct the Gateway Device 810 to not send the Fibre Channel frame encapsulated in the FCoE frame if the S ID included in the encapsulated Fibre Channel frame does not match any FCID assigned by the Fibre Channel Switch 830 to one of the Virtual Fibre Channel N Ports 833-835, 843-845 and 853-855.

Having defined the filter as described above, the Gateway Device 810 can send, to the Virtual Fibre Channel N Port 843, a Signal 864. The Signal 864 can include an FIP FLOGI response defined by the Gateway Device 810 and based on the Fibre Channel FLOGI response included in the Signal 863. In some embodiments, the FIP FLOGI response can include both the assigned MAC address and the assigned FCID for the Virtual Fibre Channel N Port 843. The Signal 864 can be received at the FCoE Port 842. Upon arrival at the FCoE Port 842, a frame formatter module (not shown in FIG. 8) at the Peripheral Processing Device 823 can send, to the Virtual Fibre Channel N Port 843, a Fibre Channel FLOGI response signal that includes the assigned MAC address and assigned FCID.

Having defined the proper addressing and filter rules, the Gateway Device 810 can receive, from the Peripheral Processing Device 824, an FCoE frame. As shown in FIG. 8, the Gateway Device 810 can receive the FCoE frame via a Signal 865 sent from the Virtual Fibre Channel N Port 853, the FCoE Port 852, the Ethernet Network 820 and the Ethernet Port 814. Upon receipt of the FCoE frame, the Gateway Device 810 can apply the above-defined filter(s) to the FCoE frame. More specifically, the Switching Module 842 of the Gateway Device 810 can determine whether a source MAC address included in the FCoE frame matches any MAC address assigned by the Fibre Channel Switch 830. If the Switching Module 842 determines that the source MAC address included in the FCoE frame matches, for example, the assigned MAC address described above, the Switching Module 842 can extract an encapsulated Fibre Channel frame included in the FCoE frame and forward the same to the Fibre Channel Switch 830. If, as shown in FIG. 8, the Switching Module 842 determines that the source MAC address included in the FCoE frame does not match any MAC address assigned by the Fibre Channel Switch 830, the Switching Module 842 can "drop" the FCoE frame (i.e., not forward it on to the Fibre Channel Switch 830 or any other device included in the network). Alternatively, the Switching Module 842 can determine whether the source MAC address included in the received FCoE frame is associated with the FCoE Port 852 (from which the FCoE frame was received). In some embodiments, the Switching Module 842 can do so by referencing an assigned MAC address/Fibre Channel port list, such as the Assigned MAC Address List 700 discussed in connection with FIG. 7 above. In some embodiments, if the Switching Module 842 determines that the source MAC address included in the received FCoE frame is not associated with the FCoE Port 852, the Switching Module 842 can drop the received FCoE frame and not forward the encapsulated Fibre Channel frame to the Fibre Channel Switch 830.

Although not shown in FIG. 8, In some embodiments, upon determining that the source MAC address included in the FCoE frame matches the assigned MAC address, the Switching Module 842 can determine whether an S ID included in the encapsulated Fibre Channel frame matches any FCID assigned by the Fibre Channel Switch 830 to one of the Virtual Fibre Channel N Ports 833-835, 843-845 and 853-855. In such embodiments, if the Switching Module 842 determines that the S ID does match an FCID assigned by the Fibre Channel Switch 830 to one of the Virtual Fibre Channel N Ports 833-835, 843-845 and 853-855, the Switching Module 842 can send the Fibre Channel frame to the Fibre Channel Switch 830. If, however, the S ID does not match any FCID assigned by the Fibre Channel Switch 830 to one of the Virtual Fibre Channel N Ports 833-835, 843-845 and 853-855, the Switching Module 842 can drop the FCoE frame.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code. While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments an access switch and a peripheral processing device in a switch fabric can be included in a single hardware device or module.

What is claimed is:

1. An apparatus comprising:

a filter module operatively coupled to a switching module, the filter module being configured to define a filter to be applied to a Fibre Channel over Ethernet (FCoE) frame received from a first port from a plurality of ports instantiated at a network device and to an FCoE frame received from a second port from the plurality of ports, the filter being defined based at least in part on a first logical address assigned to the first port from the plurality of ports, the first logical address being an assigned Media Access Control (MAC) address and based at least in part on (1) a first identifier associated with a switch fabric to which the apparatus is operatively coupled and (2) a second identifier associated with the first port from the plurality of ports and being a Fibre Channel Identifier (FCID) associated with the first port from the plurality of ports, the filter module configured to define the filter such that the switching module sends the FCoE frame received from the second port from the plurality of ports to a Fibre Channel device when a second logical address assigned to the second port from the plurality of ports and that is included in the FCoE frame received from the second port from the plurality of ports matches the first logical address.

2. The apparatus of claim 1, wherein the filter module is included in a gateway device, the gateway device configured to be operatively coupled to the network device and the switch fabric.

3. The apparatus of claim 1, wherein the FCoE frame received from the second port from the plurality of ports is a first FCoE frame received from the second port from the plurality of ports, and the filter module is configured to send a second FCoE frame to the network device based at least in part on the first logical address.

4. The apparatus of claim 1, wherein the first logical address is received by the filter module from the Fibre Channel device.

5. The apparatus of claim 1, wherein the filter module is configured to define the filter such that the switching module does not send the FCoE frame to the Fibre Channel device when (1) the second logical address included in the FCoE frame does not match the first logical address and (2) the second logical address included in the FCoE frame does not match any logical address defined by the switch fabric.

6. An apparatus, comprising:
a filter module configured to define a filter to be applied to a Fibre Channel over Ethernet (FCoE) frame received from a first virtual N-port port from a plurality of virtual N-port ports instantiated at a network device and to an FCoE frame received from a second virtual N-port port from the plurality of virtual N-port ports, the filter being defined based at least in part on a Media Access Control (MAC) address associated with the network device, the MAC address being defined based at least in part on an Organizationally Unique Identifier (OUI) and a Fibre Channel Identifier (FCID) associated with a first virtual N-port from the plurality of virtual N-ports; and
a switching module configured to be operatively coupled to the network device, the switching module configured to receive the FCoE frame from the second virtual N-port from the plurality of virtual N-ports and send the FCoE frame received from the second virtual N-port from the plurality of ports to a Fibre Channel switch when the FCoE frame received from the second virtual N-port from the plurality of ports includes a source address that matches a MAC address defined by the filter module.

7. The apparatus of claim 6, further comprising a virtual link initialization module configured to receive an FCoE Initialization Protocol (FIP) frame sent from the network device, the virtual link initialization module configured to define the MAC address based at least in part on the received FIP frame.

8. The apparatus of claim 6, wherein the FCoE frame received from the second port from the plurality of ports is a first FCoE frame received from the second port from the plurality of ports, the FCID is a first FCID and the switching module is further configured to send a second FCoE frame received from the second port from the plurality of ports to the network device based at least in part on the MAC address, the second FCoE frame received from the second port from the plurality of ports including a Fibre Channel header, the Fibre Channel header including a second FCID associated with the second virtual N-port from the plurality of virtual N-ports.

9. The apparatus of claim 6, wherein the switching module is further configured to not send the FCoE frame to the Fibre Channel switch when the source address included in the FCoE frame does not match any MAC address defined by the filter module.

10. The apparatus of claim 6, further comprising a ternary content-addressable memory (TCAM) configured to store the filter.

11. The apparatus of claim 6, further comprising an initialization module configured to receive, from the network device, a selection indicating a MAC address assignment method, the MAC address assignment method being of:
Server Provided MAC Addresses (SPMA);
Fabric Provided MAC Addresses (FPMA); or
Extended Fabric Provided MAC Addresses (EFPMA).

12. The apparatus of claim 6, further comprising an initialization module further configured to associate the MAC address with each FCID from a plurality of FCIDs, each FCID from the plurality of FCIDs being associated with a virtual N-port from the plurality of virtual N-ports instantiated at the network device.

13. A system, comprising:
a Fibre Channel switch configured to define a Media Access Control (MAC) address associated with a network device, the MAC address being defined based at least in part on an Organizationally Unique Identifier (OUI) and a Fibre Channel Identifier (FCID), the FCID associated with a first virtual N-port from a plurality of N-ports instantiated at the network device; and
a Fibre Channel over Ethernet (FCoE)-to-Fibre Channel gateway, the FCoE-to-Fibre Channel gateway being operatively coupled to the network device and the Fibre Channel switch, the FCoE-to-Fibre Channel gateway configured to receive a signal from the Fibre Channel switch, the signal having the MAC address, the FCoE-to-Fibre Channel gateway configured to define a filter based on the MAC address and to be applied to an FCoE frame received from the first virtual N-port from the plurality of virtual N-ports and an FCoE frame received from a second virtual N-port from the plurality of virtual N-ports, the FCoE-to-Fibre Channel gateway configured to send the received FCoE frame to the Fibre Channel switch when a MAC address included in the FCoE frame from a first virtual N-port or when a MAC address included in the FCoE frame from second virtual N-port satisfies the filter by matching the MAC address associated with the network device.

14. The system of claim 13, wherein the FCoE frame from second virtual N-port is a first FCoE frame from second virtual N-port, and the FCoE-to-Fibre Channel gateway is further configured to send a second FCoE frame from second virtual N-port to the network device based at least in part on the MAC address.

15. The system of claim 12, wherein the FCoE-to-Fibre Channel gateway is further configured to not send the FCoE frame from second virtual N-port to the Fibre Channel switch when the FCoE frame from second virtual N-port includes (1) the MAC address and (2) a source FCID not included in a plurality of FCIDs associated with the MAC address.

16. The system of claim 14, wherein the OUI is uniquely associated with a switch fabric in which the Fibre Channel switch is included.

17. The system of claim 14, wherein the Fibre channel switch is further configured to receive, from the network device, a request indicating a suggested MAC address assignment method, the Fibre channel switch configured to send, to the network device, a response to the request.

18. The system of claim 13, wherein the Fibre Channel switch and the FCoE-to-Fibre Channel gateway are included in a single physical device, the single physical device being operatively coupled to the network device and a Fibre Channel switch fabric.

* * * * *